United States Patent
Choi et al.

(10) Patent No.: US 9,644,591 B2
(45) Date of Patent: May 9, 2017

(54) GENERAL-PURPOSE VEHICLE REMOTE CONTROL DEVICE AND METHOD

(71) Applicant: ELECTRONICS AND TELECOMMUNICATIONS RESEARCH INSTITUTE, Daejeon (KR)

(72) Inventors: Hyunkyun Choi, Daejeon (KR); Juwan Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 263 days.

(21) Appl. No.: 14/446,912

(22) Filed: Jul. 30, 2014

(65) Prior Publication Data

US 2015/0073685 A1 Mar. 12, 2015

(30) Foreign Application Priority Data

Sep. 9, 2013 (KR) .................. 10-2013-0107659

(51) Int. Cl.
*F02N 11/08* (2006.01)
*B60H 1/00* (2006.01)
*B60R 25/20* (2013.01)

(52) U.S. Cl.
CPC ..... *F02N 11/0807* (2013.01); *B60H 1/00657* (2013.01); *B60R 25/209* (2013.01); *B60R 2325/205* (2013.01); *F02N 2200/061* (2013.01); *F02N 2200/0804* (2013.01)

(58) Field of Classification Search
CPC ............... B60R 25/209; F02N 11/0807; B60H 1/00657
USPC ......................................................... 701/113
See application file for complete search history.

(56) References Cited

U.S. PATENT DOCUMENTS

| | | | |
|---|---|---|---|
| 2010/0161720 A1* | 6/2010 | Colligan | G06Q 30/02 709/203 |
| 2013/0238167 A1* | 9/2013 | Stanfield | G08G 1/20 701/2 |
| 2014/0274013 A1* | 9/2014 | Santavicca | H04W 4/008 455/418 |

FOREIGN PATENT DOCUMENTS

| | | |
|---|---|---|
| KR | 10-2008-0024394 A | 3/2008 |
| KR | 10-2012-0014073 A | 2/2012 |
| KR | 10-2012-0063771 A | 6/2012 |
| KR | 10-2012-0078354 A | 7/2012 |

* cited by examiner

*Primary Examiner* — Sizo Vilakazi
(74) *Attorney, Agent, or Firm* — Rabin & Berdo, P.C.

(57) ABSTRACT

A general-purpose vehicle remote control device and method are disclosed. The general-purpose vehicle remote control device includes a network communication unit, a user authentication unit, a user information database, and a remote control unit. The network communication unit communicates with a user who accesses a general-purpose vehicle remote control device over a network. The user authentication unit identifies the user. The user information database stores user information required for the identification of the user. The remote control unit transceives control signals and state information with a vehicle of the identified user or remotely starts the vehicle.

14 Claims, 4 Drawing Sheets

GENERAL-PURPOSE VEHICLE REMOTE CONTROL DEVICE AND METHOD

CROSS-REFERENCE TO RELATED APPLICATION

This application claims the benefit of Korean Patent Application No. 10-2013-0107659, filed Sep. 9, 2013, which is hereby incorporated by reference herein in its entirety.

BACKGROUND OF THE INVENTION

1. Technical Field

The present disclosure relates generally to a general-purpose vehicle remote control device and method and, more particularly, to a general-purpose vehicle remote control device and method that are capable of remotely controlling a vehicle over a distance longer than the operating distance of a conventional bidirectional remote start device.

2. Description of the Related Art

The demand for remote starters and alarms has gradually increased in pursuit of convenient and safe vehicle management. With the diversification of the use of smartphones, it is possible to remotely control vehicles or check the states of vehicles in real time using smartphones. Remote starters and alarms for vehicles have been commercialized in the form of various products ranging from a product having the functions of opening and closing the door of a vehicle and remotely starting a vehicle via unidirectional communication to a product capable of preventing a vehicle from being stolen and checking the state of a vehicle via bidirectional communication. Common remote starters and alarms may be classified into AM type devices using a frequency of 311 MHz and FM type devices using a frequency of 447 MHz according to their communication frequency, and may be classified into unidirectional type devices and bidirectional type devices according to their communication direction as described above. Among these devices, devices using smartphones enable users to remotely start their vehicles and to check the states of their vehicles using smartphones anytime and anywhere because the vehicles are equipped with the function of communicating with the smartphones.

Remote vehicle-related services include remote vehicle start/stop, remote door closing and opening, and remote trunk closing and opening. Recently, a wireless control vehicle (Su Rui produced by BYD company of China) that can be remotely driven using a dedicated remote control over a distance within 10 m has been commercialized. Although this wireless remote control vehicle has a maximum hourly speed of 2 km/h when it is driven using a remote control, it provides convenience that eliminates the need to walk to the vehicle when a driver parks the vehicle or when it is raining. The remote control provides an intuitive interface based on door closing and opening function buttons and a touch pad, thereby enabling anybody to easily use remote control functions.

However, since the above conventional remote starters and alarms can work within a distance close to a vehicle, they cannot be used to remotely control a vehicle parked in a parking lot from an office of a tall building or a apartment house and also it is difficult to check the state of a vehicle using them. In order to resolve this problem, the present invention presents general-purpose remote control technology that enables a user to control his or her vehicle located at a remote location.

As a related preceding technology, Korean Patent Application Publication No. 10-2012-0063771 discloses a remote vehicle start system.

SUMMARY OF THE INVENTION

Accordingly, at least one embodiment of the present invention is intended to provide a general-purpose vehicle remote control device that is capable of remotely controlling a vehicle or checking the state of the vehicle over a distance longer than the operating distance of an existing remote start device regardless of the type of existing remote start device provided in the vehicle.

At least one embodiment of the present invention is intended to provide a general-purpose vehicle remote control device that enables a private communication network to be used after the performance of a remote start rather than making the private communication network be always used because the remote start and remote control of a vehicle using the private communication network may cause excessive communication cost or the discharge of a battery, thereby preventing excessive communication cost or the discharge of a battery from occurring.

In accordance with an aspect of the present invention, there is provided a general-purpose vehicle remote control device, including a network communication unit configured to communicate with a user over a network; a user authentication unit configured to identify the user; a user information database configured to store user information required for the identification of the user; and a remote control unit configured to transceive control signals and state information with a vehicle of the identified user or to remotely start the vehicle.

The remote control unit may include one or more types of remote start interfaces each configured to transmit a start signal to the vehicle, the one or more types of remote start interfaces transmitting the start signal depending on a type of a remote start devices provided in the vehicle.

The remote control unit, when the vehicle supports a private communication network, may power up units for the private communication network by transmitting the start signal to the vehicle.

The remote control unit may transceive data having a limited data size as the control signals and the state information without starting the vehicle.

The user authentication unit may identify the user using an ID and a password input by the user.

The user authentication unit may include a user registration unit configured to register a new user with the user information database; and an information update unit configured to change the user information stored in the user information database.

The network communication unit may output the state information of the vehicle received through the remote control unit to the user.

The control signals may include signals operative to perform the opening/closing of the door, operation of the air conditioner and the heater and opening/closing of the trunk of the vehicle.

The state information may include information about the internal temperature state, door closed state, trunk closed state, external impact state, battery charged state, and fuel state of the vehicle.

The private communication network may be a bidirectional communication-enabled network.

In accordance with another aspect of the present invention, there is provided a general-purpose vehicle remote control method, including accessing a general-purpose vehicle remote control device over a network; identifying a user; and transceiving control signals and state information with a vehicle of the user, or transceiving the control signals and the state information after remotely starting the vehicle.

The transceiving may include starting the vehicle by transmitting a start signal to the vehicle through one or more remote start interfaces included in a remote control unit, and the remote control unit includes the one or more types of remote start interfaces transmitting the start signal depending on a type of a remote start devices provided in the vehicle.

The transceiving may include, when the vehicle supports a private communication network, powering up units for the private communication network by transmitting the start signal to the vehicle.

The transceiving may include transceiving data having a limited data size as the control signals and the state information without starting the vehicle.

The identifying may include identifying the user using an ID and a password input by the user.

The identifying may include registering a new user with a user information database; and changing user information stored in the user information database.

The transceiving may include outputting state information of the vehicle to the user.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
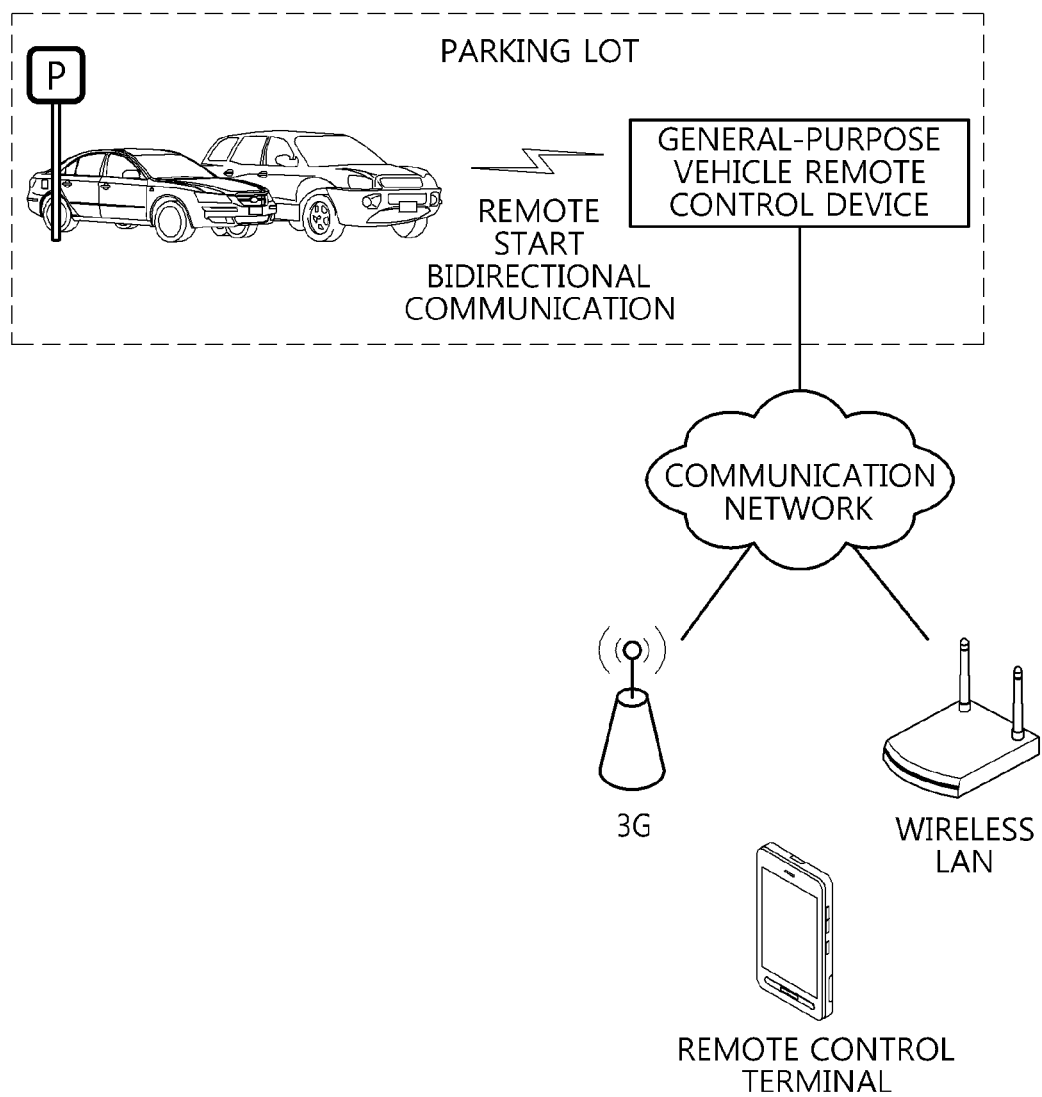
FIG. 1 is a diagram illustrating an environment to which a general-purpose vehicle remote control device according to an embodiment of the present invention has been applied.

The present invention is described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

Embodiments of the present invention are described in detail with reference to the accompanying drawings.

FIG. 1 is a diagram illustrating an environment to which a general-purpose vehicle remote control device according to an embodiment of the present invention has been applied.

Referring to FIG. 1, the environment to which a general-purpose vehicle remote control device according to an embodiment of the present invention has been applied includes the general-purpose vehicle remote control device installed in a parking lot, a vehicle equipped with a remote start device, a bidirectional communication-enabled network, and a user remote control terminal.

When the general-purpose vehicle remote control device according to the present invention is used, it is possible to remotely control a vehicle parked in a parking lot over a long distance from an office of a tall building or an apartment house. A user accesses the general-purpose vehicle remote control device installed in the parking lot using the remote control terminal, such as a smartphone or a personal computer (PC), thereby being able to transmit control signals to the vehicle or to receive the state information of the vehicle. In this case, the remote control terminal may make access using the IP address of the general-purpose vehicle remote control device, and thus a vehicle can be remotely controlled in any place where the Internet can be used. Furthermore, in the case of a vehicle that can be remotely started through the general-purpose vehicle remote control device, an existing remote start device can be used without change, and thus there is no burden of cost. The general-purpose vehicle remote control device that is chiefly installed in a parking lot may be installed in a space that is not designated as a parking lot but allows drivers to part their vehicles. Furthermore, at least one general-purpose vehicle remote control device may be installed in a single parking space, but this embodiment is not limited thereto.

Figure 2:
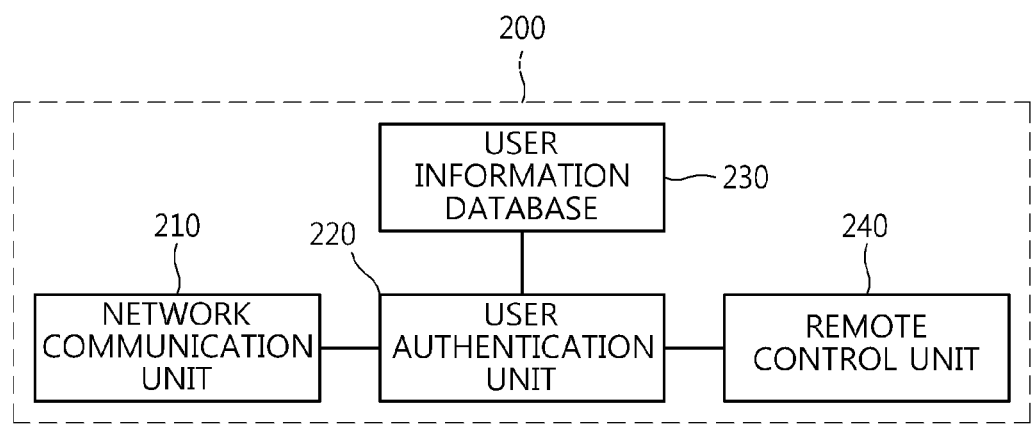
FIG. 2 is a block diagram of a general-purpose vehicle remote control device according to an embodiment of the present invention.

FIG. 2 is a block diagram of a general-purpose vehicle remote control device 200 according to an embodiment of the present invention.

Referring to FIG. 2, the general-purpose vehicle remote control device 200 may include a network communication unit 210 configured to communicate with a user, a user authentication unit 220 configured to identify the user, a user information database 230 configured to store user information required for the identification of the user, and a remote control unit 240 configured to transceive control signals and state information with the vehicle of the identified user or to remotely start the vehicle.

Conventional remote starters and alarms for vehicles have been commercialized in the form of various products ranging from a product having the functions of opening and closing the door of a vehicle and remotely starting a vehicle via unidirectional communication to a product capable of preventing a vehicle from being stolen and checking the state of a vehicle via bidirectional communication. Common remote starters and alarms may be classified into AM type devices using a frequency of 311 MHz and FM type devices using a frequency of 477 MHz according to their communication frequency, and may be classified into unidirectional type devices and bidirectional type devices according to their communication direction as described above. Among these devices, devices using smartphones enable users to remotely start their vehicles and to check the states of their vehicles using smartphones anytime and anywhere because the vehicles are equipped with the function of communicating with the smartphones. Remote vehicle-related services include remote vehicle start/stop, remote door closing and opening, and remote trunk closing and opening. Recently, a wireless control vehicle (Su Rui produced by BYD company of China) that can be remotely driven using a dedicated remote control over a distance within 10 m has been commercialized. Although this wireless remote control vehicle has a maximum hourly speed of 2 km/h when it is driven using a remote control, it provides convenience that eliminates the need to walk to the vehicle when a driver parks the vehicle or when it is raining. The remote control provides an intuitive interface based on door closing and opening function buttons and a touch pad, thereby enabling anybody to easily use remote control functions. However, since the above conventional remote starters and alarms can work within a distance close to a vehicle, they cannot be used to remotely control a vehicle parked in a parking lot from an office of a tall building or a apartment house and also it is difficult to check the state of a vehicle using them. The general-purpose vehicle remote control device according to at least one embodiment of the present invention can resolve the above problems.

The network communication unit 210 enables communication with the user who has accessed the general-purpose vehicle remote control device 200 over a network.

The user authentication unit 220 may identify a user by receiving information, such as an ID and a password, from the user attempting to access the general-purpose vehicle remote control device 200 and determining whether the input information matches information stored in the user information database 230. A user who first accesses the general-purpose vehicle remote control device 200 may input information, such as a new ID and a new password, to a user registration unit included in the user information database 230 and thus register with the user information database 230. Furthermore, when an existing user who has used the general-purpose vehicle remote control device 200 wants to change user information, he or she may change user information through an information update unit included in the user information database 230. In this case, the user information may be information, such as user personal information and vehicle information, including an ID and a password used to access the general-purpose vehicle remote control device 200.

The user information database 230 may store user information that is required when the user authentication unit 220 identifies the user. Furthermore, the user information database 230 includes the user registration unit and the information update unit, and may register information about a new user or change information about an existing user.

The remote control unit 240 may transceive control signals and state information with the vehicle of the user identified by the user authentication unit 220, and may remotely control the vehicle. In this case, the remote start interface included in the remote control unit 240 may transmit a remote start signal to the remote start device provided in the vehicle of the user. An existing remote start device having been used in the vehicle may be used without change as the remote start device provided in the vehicle. Since the types of remote start devices provided in vehicles may be various, all vehicles may be remotely started by providing at least one type of remote start interface in the remote control unit 240.

Furthermore, the remote control unit 240 enables the general-purpose vehicle remote control device 200 and the vehicle to transceive control signals and state information. In this case, the control signals may include control signals operative to perform the opening/closing of the door, operation of the air conditioner and heater and opening/closing of the trunk of the vehicle. Furthermore, the state information may be information about the internal temperature state, door closed state, trunk closed state, external impact state, battery charged state, and fuel state of the vehicle. In this case, the state information received from the vehicle general-purpose vehicle remote control device 200 may be output to the accessing user so that the user can view it. Furthermore, when the vehicle supports a private communication network for a service, such as remote control or autonomous driving, the units for the private communication network may be powered up by transmitting a start signal to the vehicle. When a conventional vehicle remote control device uses a private communication network, it is problematic in that communication cost is excessive or the battery of a vehicle is discharged because power is always supplied to the private communication network. In contrast, in the present invention, in order to resolve the above problem, the units for the private communication network is powered up and then used after the starting of a vehicle via the remote control unit 240. In this case, the private communication network is a bidirectional communication-enabled network, and may be a 3G network or a wireless local area network (LAN). Meanwhile, the remote control unit 240 may transceive control signals and state information each having a size equal to or smaller than a preset data size with a vehicle in the state in which the vehicle has not been started. When state information requiring high power consumption, such as a video, is transmitted, a vehicle is started via the remote control unit 240 and then communication is performed through the units for the private communication network deployed in the vehicle.

Figure 3:
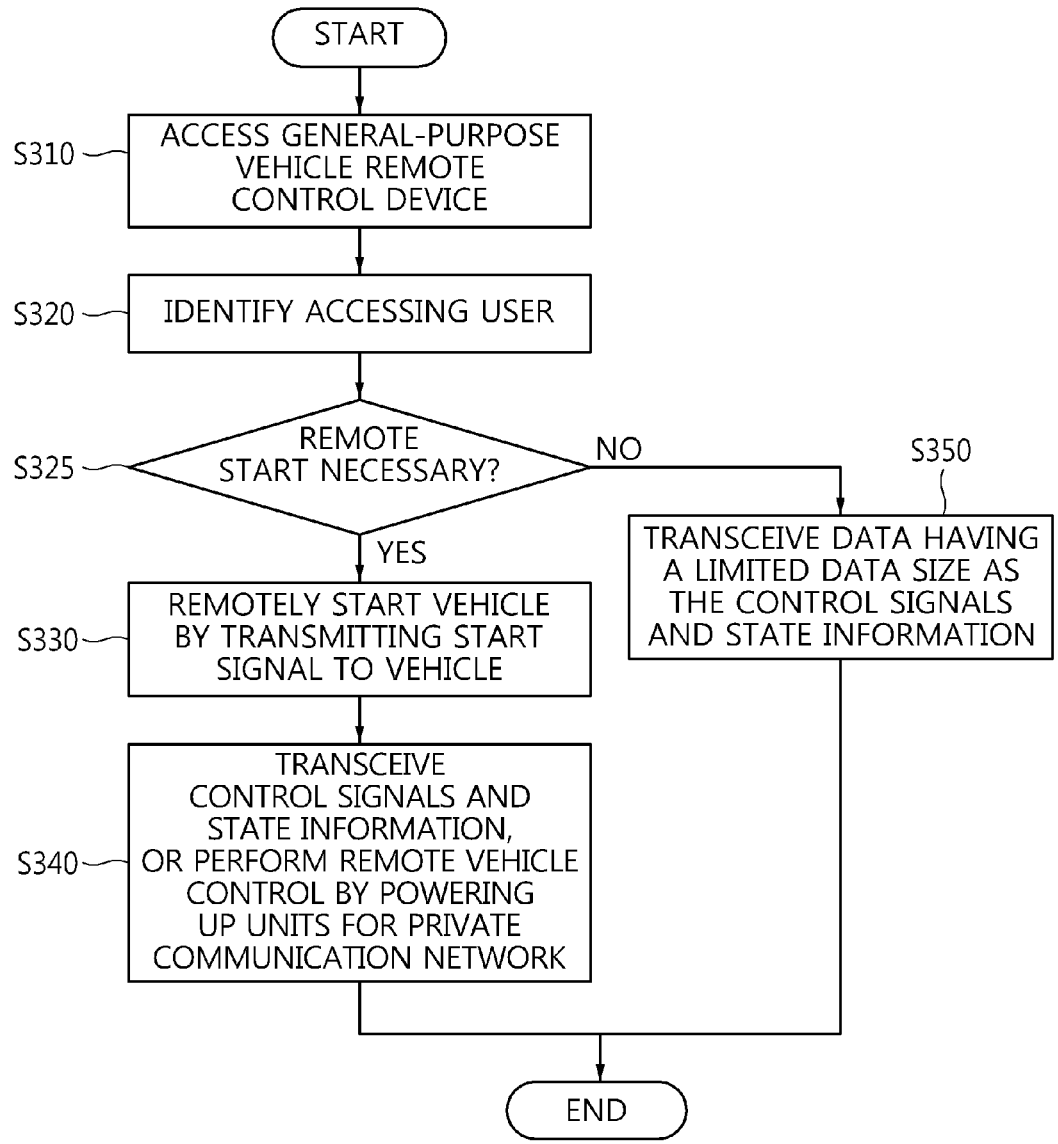
FIG. 3 is a flowchart of a general-purpose vehicle remote control method according to an embodiment of the present invention.

FIG. 3 is a flowchart of a general-purpose vehicle remote control method according to an embodiment of the present invention.

Referring to FIG. 3, in the general-purpose vehicle remote control method according to this embodiment of the present invention, the general-purpose vehicle remote control device may be accessed over a network at step S310. The general-purpose vehicle remote control device may be accessed using a remote control terminal, such as a smartphone or a PC in any place where a network is connected.

Thereafter, to identify the user who attempts to access the general-purpose vehicle remote control device, the step of identifying the user using the user authentication unit is performed at step S320. The identification of the user may be performed using an ID and a password received from the user attempting to access the general-purpose vehicle remote control device and the user information stored in the user information database. If the user who attempts to access the general-purpose vehicle remote control device is a new user whose information is not present in the user information database, the user information of the user may be registered and then used via the user registration unit. In this case, the user information may be information, such as the user personal information and vehicle information, including an ID and a password. Furthermore, when a user whose information is present in the user information database wants to change existing information, the information may be changed using the information update unit.

Whether to remotely start a parked vehicle is determined based on a service desired by the identified user at step S325.

If, as a result of the determination at step S325, it is determined that it is necessary to remotely start the vehicle, the vehicle may be started by transmitting a start signal to the vehicle at step S330. The remote control unit may include a remote start interface capable of transmitting a start signal to the parked vehicle. In this case, the remote start interface may remotely start the vehicle by transmitting a start signal to a remote start device installed in the vehicle. Since the types of remote start devices provided in vehicles may be various, all vehicles may be remotely started by providing remote start interface, the remote start interface may be at least one type or more in the remote control unit.

Thereafter, control signals and state information may be transceived with the vehicle, or the units for the private communication network provided in the vehicle may be powered up and a remote control or autonomous driving service may be provided to the vehicle at step S340. After the vehicle has been started, control signals and state information may be transceived with the vehicle through the remote control unit via bidirectional communication. After the vehicle has been started, the general-purpose vehicle remote control device may remotely control the vehicle by transmitting a control signal desired by the user to the vehicle, and may receive the current state information of the vehicle from the vehicle reception and display it to the user. The control signals operative to remotely control the vehicle may include signals operative to perform the opening/closing of the door, operation of the air conditioner and heater and opening/closing of the trunk of the parked vehicle. Furthermore, the state information may be information about the internal temperature state, door closed state, trunk closed state, external impact state, battery charged state and fuel state of the vehicle. In this case, if units for a private communication network has been installed in the vehicle, the units for the private communication network is not powered up when the vehicle has not been started and is powered up when the vehicle has been started. The reason why the units for the private communication network is powered up by using the above-described method is that a communication cost problem and a vehicle battery discharge problem that occur when the units for the communication network is always powered up can be prevented by using the method. In this case, the private communication network used is a bidirectional communication-enabled network, and may be a 3 G communication network or a wireless LAN.

If, as a result of the determination at step S325, it is determined that remote start is not necessary, data having a limited data size as the control signals and the state information may be transceived with the vehicle not started through the remote control unit at step S350.

Figure 4:
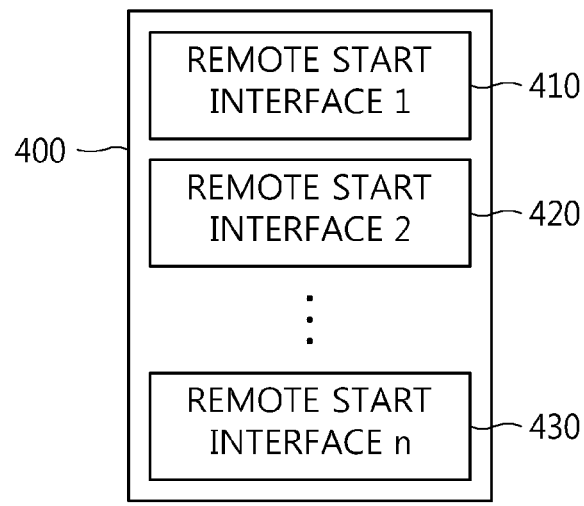
FIG. 4 is a diagram illustrating a remote control unit according to an embodiment of the present invention.

FIG. 4 is a diagram illustrating a remote control unit 400 according to an embodiment of the present invention.

Referring to FIG. 4, the remote control unit 400 according to this embodiment of the present invention includes remote start interfaces 410, 420 and 430. When a start signal is transmitted to a parked vehicle through the general-purpose vehicle remote control device, the signal may be transmitted through the remote start interface 410, 420 and 430 included in the remote control unit.

Since most recent vehicles can be remotely started using a remote control, the remote start device is installed and used in the vehicle. In vehicles, various devices, including an immobilizer for starting a vehicle using long distance wireless communication only when an encryption code matches the key of the vehicle, a remote wireless door locking device for enabling the door of a vehicle to be opened by pressing a remote control, etc., are used. In most vehicles, devices in which wireless door locking devices have been combined with remote start devices are used.

Using the method of remotely starting a parked vehicle by transmitting a start signal to a remote start device provided in the parked vehicle, it may be possible to start a vehicle through the remote start interface 410 suitable for the existing remote start device used in the vehicle. However, since the types of remote start devices provided in vehicles may be various, all vehicles may be remotely started by providing remote start interface 410, 420 and 430, the remote start interface 410, 420 and 430 may be at least one type or more in the remote control unit 400.

Figure 5:
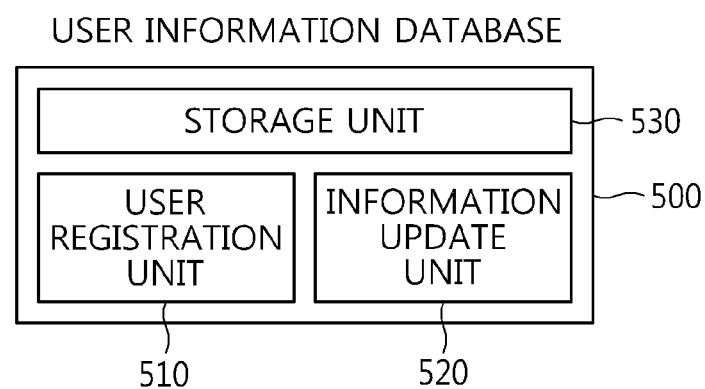
FIG. 5 is a diagram illustrating a user information database according to an embodiment of the present invention.

FIG. 5 is a diagram illustrating a user information database 500 according to an embodiment of the present invention.

Referring to FIG. 5, the user information database 500 according to this embodiment of the present invention includes a user registration unit 510 configured to register a new user, an information update unit 520 configured to change the information of an existing user, and a storage unit 530 configured to store user information.

The user registration unit 510 may register user information when a new user whose user information has not been registered in the user information database 500 attempts to access the general-purpose vehicle remote control device. An existing user who has used the general-purpose vehicle remote control device may access the general-purpose vehicle remote control device by inputting user identification information, such as an ID and a password, and performing user authentication. In contrast, a user who first uses the general-purpose vehicle remote control device may access the general-purpose vehicle remote control device after registering user information with the user information database 500. In this case, the user information may be information, such as user personal information and vehicle information, including an ID and a password.

The information update unit 520 may change the user information of an existing user who has used the general-purpose vehicle remote control device. For example, when a user wants to change vehicle information due to the change of his or her vehicle or wants to newly register vehicle information, the information update unit 520 may be used.

The storage unit 530 stores user information, and matches the stored user information with input user information when a user inputs the user information, such as an ID and a password, in order to access the general-purpose vehicle remote control device. The user information stored in the storage unit 530 may be information, such as user personal information and vehicle information, including an ID and a password.

At least one embodiment of the present invention provides a general-purpose vehicle remote control device that is capable of remotely controlling a vehicle or checking the state of the vehicle over a distance longer than the operating distance of an existing remote start device regardless of the type of existing remote start device provided in the vehicle.

At least one embodiment of the present invention provides a general-purpose vehicle remote control device that enables a private communication network to be used after the performance of a remote start rather than making the private communication network be always used because the remote start and remote control of a vehicle using the private communication network may cause excessive communication cost or the discharge of a battery, thereby preventing excessive communication cost or the discharge of a battery from occurring.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:
1. A vehicle remote control device for a vehicle having a predetermined range, measured in distance, for receiving remote control commands, comprising:

a network communication unit configured to communicate with a user over a network, the user located outside the predetermined range, and vehicle remote control device located within the predetermined range from the vehicle;

a user authentication unit configured to identify the user;

a user information database configured to store user information required for the identification of the user; and a remote control unit configured to transceive control signals and state information with the vehicle or to remotely start the vehicle based on identifying the user via the user authentication unit, wherein the remote control unit is configured to power up a private communication network of the vehicle by transmitting a start signal to the vehicle, the private communication network being a bidirectional communication-enabled network, wherein the private communication network is one of a telecommunications network and a local area wireless network, wherein the user authentication unit identifies the user using an ID and a password input by the user.

2. The vehicle remote control device of claim 1, wherein the remote control unit comprises one or more types of remote start interfaces each configured to transmit a start signal to the vehicle, the one or more types of remote start interfaces transmitting the start signal depending on a type of a remote start devices provided in the vehicle.

3. The vehicle remote control device of claim 1, wherein the remote control unit is configured to transmit or receive data less than a predetermined data size as the control signals and the state information without starting the vehicle, and the remote control unit is configured to start the vehicle to transmit or receive data equal to, or larger than, the predetermined data size.

4. The vehicle remote control device of claim 1, wherein the user authentication unit comprises:

a user registration unit configured to register a new user with the user information database; and an information update unit configured to change the user information stored in the user information database.

5. The vehicle remote control device of claim 4, wherein the network communication unit outputs the state information of the vehicle received through the remote control unit to the user.

6. The vehicle remote control device of claim 5, wherein the control signals comprise signals operative to perform opening/closing of a door, operation of an air conditioner and a heater and opening/closing of a trunk of the vehicle.

7. The vehicle remote control device of claim 6, wherein the state information comprises information about an internal temperature state, door closed state, trunk closed state, external impact state, battery charged state, and fuel state of the vehicle.

8. A vehicle remote control method, comprising:

accessing, by a user over a network, a vehicle remote control device for a vehicle, the vehicle having a predetermined range, measured in distance, for receiving remote control commands, the user located outside the predetermined range, and vehicle remote control device located within the predetermined range from the vehicle;

identifying the user by the vehicle remote control device; and based on identifying the user, transceiving control signals and state information with the vehicle, or transceiving the control signals and the state information after remotely starting the vehicle, wherein the transceiving comprises powering up units of a private communication network by transmitting a start signal to the vehicle, the private communication network being a bidirectional communication-enabled network, wherein the private communication network is one of a telecommunications network and a local area wireless network wherein the identifying comprises identifying the user using an ID and a password input by the user.

9. The vehicle remote control method of claim 8, wherein the transceiving comprises starting the vehicle by transmitting a start signal to the vehicle through one or more remote start interfaces included in a remote control unit, and the remote control unit includes the one or more types of remote start interfaces transmitting the start signal depending on a type of a remote start devices provided in the vehicle.

10. The vehicle remote control method of claim 8, wherein the transceiving comprises transmitting or receiving data having a data size less than a predetermined data size as the control signals and the state information without starting the vehicle, and starting the vehicle to transmit or receive data equal to, or larger than, the predetermined data size.

11. The vehicle remote control method of claim 8, wherein the identifying comprises:

registering a new user with a user information database; and changing user information stored in the user information database.

12. The vehicle remote control method of claim 11, wherein the transceiving comprises outputting state information of the vehicle to the user.

13. The vehicle remote control method of claim 12, wherein the control signals comprise signals operative to perform opening/closing of a door, operation of an air conditioner and a heater and opening/closing of a trunk of the vehicle.

14. The vehicle remote control method of claim 13, wherein the state information comprises information about an internal temperature state, door closed state, trunk closed state, external impact state, battery charged state, and fuel state of the vehicle.

* * * * *